Figure 3:
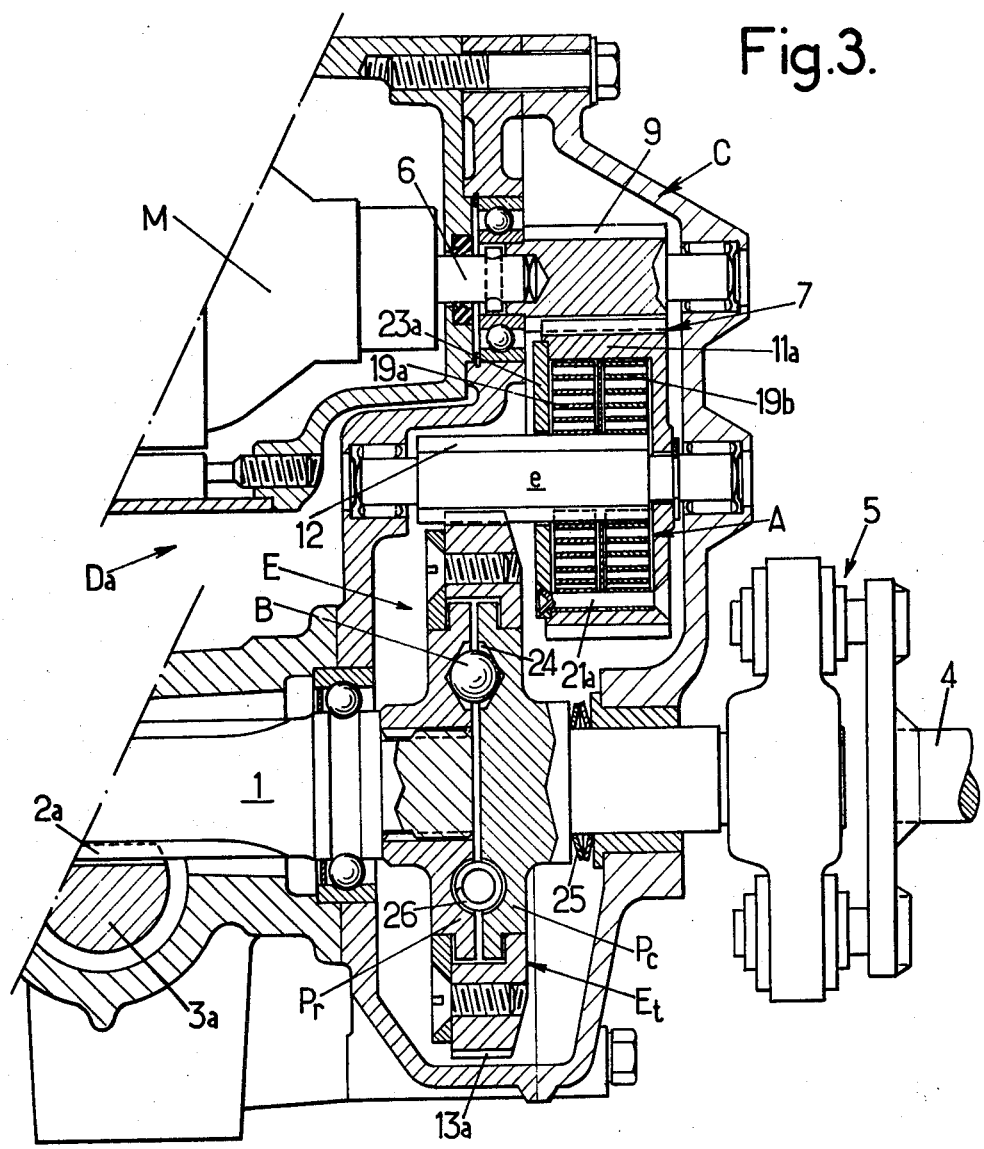

United States Patent [19]

Barthelemy

[11] 4,409,503

[45] Oct. 11, 1983

[54] ROTARY ASSISTANCE DEVICE, MORE ESPECIALLY FOR VEHICLE STEERING

[75] Inventor: André Barthelemy, Saint Remy les Chevreuse, France

[73] Assignees: Automobiles Citroen; Automobiles Peugeot, both of Paris, France

[21] Appl. No.: 311,604

[22] Filed: Oct. 15, 1981

[30] Foreign Application Priority Data

Oct. 20, 1980 [FR] France ............................ 80 22407

[51] Int. Cl.³ .............................................. H02K 7/10
[52] U.S. Cl. .................................. 310/75 D; 310/83; 74/388 R
[58] Field of Search ................... 310/75 R, 75 D, 83, 310/69; 74/388

[56] References Cited

U.S. PATENT DOCUMENTS

| 1,535,639 | 4/1925 | Weber | 310/75 D |
| 2,500,175 | 3/1950 | Guthrie | 310/75 D |

*Primary Examiner*—Donovan F. Duggan
*Attorney, Agent, or Firm*—Stevens, Davis, Miller & Mosher

[57] ABSTRACT

A rotary assistance device (D) is provided adapted to be coupled to a driven member (1) capable of rotating in both directions, particularly in response to the rotation of a drive shaft (4), this device comprising a motor (M) able to rotate at a relatively high speed with respect to that of the drive shaft (4) and of the driven member (1), speed reducing means (7) and friction coupling means (E1, E2) for driving the driven shaft (1) through the speed reducing means (7) and the motor (M). The device comprises angular torque damping means (A) disposed between the motor (M) and the friction coupling (E1, E2).

6 Claims, 3 Drawing Figures

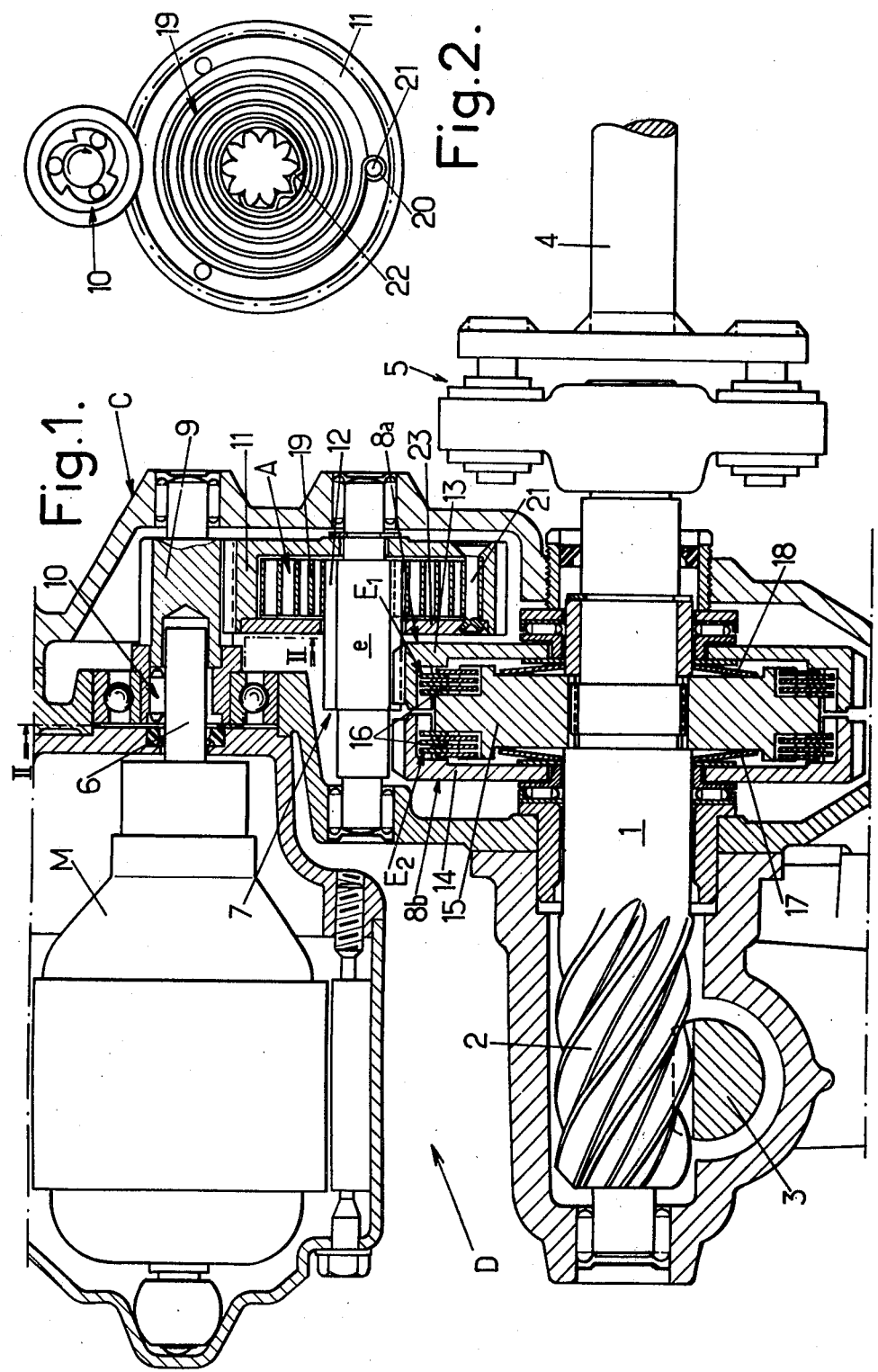

ROTARY ASSISTANCE DEVICE, MORE ESPECIALLY FOR VEHICLE STEERING

The invention relates to a rotary assistance device adapted to be coupled to a driven member rotatable in both directions, more especially in response to the rotation of a drive shaft, which device is of the kind comprising a motor able to rotate at a relatively high speed with respect to that of the drive shaft and of the driven member, means for reducing the speed of the motor, and friction coupling means adapted to ensure the drive of the driven shaft by the reduction means and the motor.

The invention concerns more particularly, because it is in this case that its application seems to present the greatest interest, but not exclusively, such rotary assistance devices for motor vehicle steering.

The invention has as its aim, especially, to make the rotary assistance devices of the kind in question such that they answer better than heretofore the different requirements of practice and particularly such that their operation is smoother and more silent and that their operating life is increased.

According to the invention, a rotary assistance device adapted to be coupled to a driven member rotatable in both directions, especially in response to the rotation of the drive shaft, is characterized by the fact that it comprises means for angular damping of the torque, disposed between the motor and the friction coupling.

Preferably, these angular damping means are formed by a resilient coupling of great flexibility.

Advantageously, this highly flexible resilient coupling is formed by at least one spiral spring.

These angular damping means may be disposed inside a pinion forming part of a reduction gear-train serving as reduction means.

The motor, more especially an electric motor, may rotate in one direction only, in which case the reduction means comprise two reduction gear-trains, associated with two friction couplings, corresponding to the two rotational directions. One of these gear-trains comprises a reversing gear more than the other so as to provide reversal of the rotational direction; a single spiral spring is then disposed between the motor and a shaft or pinion common to the two gear-trains.

According to another possibility, the motor may rotate in one direction or in the other, according to the drive direction; a single reduction gear-train connects the motor to the driven shaft, through a single friction coupling. The angular damping means then comprise, advantageously, two spiral springs wound in opposite directions, disposed more especially in a cavity provided in a pinion of the reduction train.

Preferably, the turns of both spiral springs, wound in opposite directions, have a greater unwinding capacity than winding, so that, when one of the springs is totally wound up, the other is not totally unwound.

The invention consists, apart from the arrangements discussed above, of certain other arrangements which will be more explicitly discussed hereafter in connection with particular embodiments described with reference to the accompanying drawings, but which are in no wise limiting.

FIG. 1, of these drawings, is an axial section, with parts cut away, of a rotary assistance device in accordance with the invention.

FIG. 2 is a partial view along II—II of FIG. 1.

FIG. 3, finally, shows similarly to FIG. 1 another possible embodiment of the rotary assistance device.

Referring to the drawings, particularly to FIG. 1, a rotary assistance device D can be seen adapted to be coupled to a driven member 1 able to rotate in both directions. In the example shown in the drawings, the driven member 1 is formed by a shaft end integral with a pinion 2 for driving a motor vehicle steering rack 3.

A drive shaft 4 is adapted to rotate, through a coupling 5, more especially a resilient-sleeve coupling, the driven member 1. The drive shaft 4 is itself driven by a steering wheel (not shown).

The assistance device D comprises an electric motor M whose shaft 6 and rotor are rotatable at a relatively high speed with respect to that of the drive shaft 4 and of the driven member 1. The shaft 6 of motor M is disposed parallel to the axis of the driven member 1.

Speed reduction means 7 for reducing the speed of motor M, formed by one or more reduction gear-trains, are provided so as to rotatably drive, at a lower speed, the driven member 1.

Friction coupling means E1, E2 are disposed at the output of the speed reduction means 7 for driving the driven member 1.

The electric motor M is intended to rotate in a single direction of rotation in the example of FIG. 1, and the speed reduction means 7 comprise two gear-trains 8a, 8b, associated respectively with two friction couplings E1, E2 and with the two possible directions of rotation of driven member 1.

The two gear-trains 8a, 8b have, in common, a pinion 9 coaxial with the input shaft 6 and mounted on the end of this shaft; this pinion is rotated by shaft 6, through a freewheel 10; thus, should pinion 9 become driving, the shaft 6 and rotor of motor M would not be rotated because of the presence of this freewheel.

The two trains 8a, 8b also have in common a pinion 11, of larger diameter, meshing with pinion 9, and a pinion 12 coaxial with pinion 11 but smaller in diameter.

The gear-train 8a comprises a crown-gear 13, coaxial with the driven member 1, and forming a part of the clutch E1; this crown-gear 13 meshes directly with pinion 12.

The reduction train 8b comprises a crown-gear 14, similar to gear 13, forming part of clutch E2, and coaxial with the driven member 1; this crown-gear 14 cooperates with an additional reversing pinion (not shown), itself driven by pinion 12; thus, crown-gear 14 is rotated in the opposite direction to crown-gear 13.

The actuation of clutch E1 or E2 is controlled, depending on the rotational direction of drive shaft 4, so that the assistance is exercised in the same direction as the drive provided by shaft 4.

The actuation of clutches E1 or E2 takes place from a threshold value of the torque exerted on the drive shaft 4; different solutions are possible for controlling this actuation of the clutches. For example, the angular deviation, at the level of coupling 5, between drive shaft 4 and driven member 1 may be detected or a torque sensor mounted on shaft 4 may be provided.

In the solution shown in FIG. 1, the driven member 1 is mounted with the possibility of sliding along its axis; pinion 2 comprises teeth inclined so that the cooperation of the pinion with the rack generates an axial component in the driven member 1, which component tends to cause the driven member 1 to slide axially.

The driven member 1 is translatably and rotatably connected to a plate 15 forming the driven member for the two clutches E1, E2, whereas the crown-gears 13 and 14 form, respectively, the driving members of these clutches E1, E2. Friction disks 16 are provided between plate 15 and crown-gears 13 and 14.

The driven member 1 and plate 15 are held in their median position by resilient return means formed, more especially, by deformable resilient washers 17, 18. For this median position of plate 15, the friction disks 16 are not clamped axially and neither of the two clutches E1, E2 is in action.

When a drive torque is exerted on shaft 4, the axial component which is produced at pinion 2 causes movement of the driven member 1 and of plate 15 against the resilient means 17 or 18, depending on the rotational direction.

The friction disks 16, of the corresponding clutch E1 or E2, are then clamped between plate 15 and the corresponding crown-gear 13 or 14 and the assistance provided by motor M comes into action.

The assistance device D further comprises means A for the angular damping of the torque, disposed between motor M and the friction couplings E1, E2.

These angular damping means A are advantageously formed by a resilient coupling of great flexibility formed by at least one spiral spring 19.

In the embodiment of FIG. 1, where motor M rotates in a single direction, a single spiral spring 19 is provided and disposed between motor M and the rotational direction reverser formed by crown-gear 13 and crown-gear 14 associated with the reversing pinion (not visible).

Advantageously, the spiral spring 19 is housed inside a cavity provided in pinion 11, of large diameter, common to the two gear-trains 8a, 8b.

As can be seen in FIG. 2, the outer end 20 of spiral spring 19 is integral with pinion 11, being anchored for example to a stud 21 rigidly connected to this pinion. The inner end 22 of spring 19 is locked in rotation with shaft e carrying pinion 11; this shaft e is provided outwardly with teeth forming pinion 12 (which was discussed previously); this pinion 12 extending inside pinion 11 as can be seen in FIG. 1. The parts of the teeth of pinion 12, situated inside pinion 11, are used for engaging with the inner end 22 of spring 19, as can be seen in FIG. 2; this end 22 is shaped with an undulating profile appropriate for cooperating with several teeth of pinion 12.

As can be seen in FIG. 1, the cavity provided inside pinion 11 is closed, on one side (right-hand side of FIG. 1) by a wall forming an integral part of pinion 11 and, on the other side, by a removable wall 23.

The assembly of the speed reducing means 7 and the friction clutches E1, E2 is disposed inside a casing C.

The operation of the assistance device of the invention follows directly from the preceding explanations.

As soon as the assistance device comes into action, by engagement of clutch E1 or E2, the spiral spring 19 winds up (pinion 11 rotates with respect to pinion 12), transmitting an increasing torque from pinion 11 to pinion 12, until it becomes maximum when the spring is completely wound up. The winding-up period, which depends on the angular speed of pinion 11 as well as on the number of turns of spring 19 and their spacing, is determined so as to provide rapid actuation without however causing a jolt.

The result is smooth and silent operation and improvement in the mechanical strength of the components of the device.

It should be noted that motor M may rotate either permanently, or only when, in response to a drive torque exerted on shaft 4 higher than a given threshold, a sensor controls the starting up on this motor M.

Referring to FIG. 3, another embodiment may be seen corresponding to the case where motor M is adapted and controlled so as to be able to rotate in one direction or in the other.

Identical parts or those playing similar roles to the parts already described with reference to FIGS. 1 and 2 are designated by the same reference numbers, possibly followed by the letter a, without description thereof being taken up again in detail.

A single clutch E is provided, this clutch working in both directions. This clutch may comprise two plates $P_r$ and $P_c$ in which are provided grooves 24 serving as housings for balls B, the bottoms of the grooves having a conical shape. A relative rotation of one plate with respect to the other causes the balls to roll against the bottoms of the grooves and the plates to move apart axially against resilient return means formed, for example, by deformable washers 25 acting by axial thrust. Angular return springs 26 may further be provided and housed in recesses provided in the opposing faces of plates $P_c$ and $P_r$, these springs 26 working under compression. The outer edges of plates $P_c$ and $P_r$ bear against the flanges of a rotary element $E_t$, forming a case and having at its periphery teeth forming the crown-gear 13a which cooperates with pinion 12. A clutch of this type, for a rotary assistance device, has already been described in French Patent Application FR No. 78 32 839 filed on Nov. 21, 1978 and published under No. 2 442 476. Reference should be made to this patent application for further details relating to such a clutch.

In the embodiment of FIG. 3, pinion 9 is directly rotated by shaft 6; the freewheel 10 of FIG. 1 has been omitted.

The control of the rotation of motor M in one direction or in the other is provided by electrical contact means (not shown) responding to the rotational direction of drive shaft 4. Such contact means are known and have been described, more especially in the Patent Application FR No. 78 32 839 (publication No. 2 442 476) already cited.

The speed-reducing means 7 for reducing the speed of motor M comprise a single gear-train formed by pinions 9, 11a, 12 and the single crown-gear 13a.

Angular damping means A comprise two spiral springs 19a, 19b wound in opposite directions and disposed in a cavity provided inside pinion 11a; the axial length of this pinion is sufficient to allow both spiral springs 19a, 19b to be housed.

The engagement of the outer end and of the inner end of each spiral spring on pinion 11a and on the shaft of this pinion provided with teeth forming pinion 12, is achieved in the same way as described with reference to FIGS. 1 and 2.

The turns of each spring 19a, 19b have a greater unwinding than winding-up capacity so that one of the springs is completely wound up before the other spring is completely unwound.

The operation of the assistance device $D_a$ of FIG. 3 is similar to that of the device of FIG. 1.

Depending on the direction of rotation of motor M, one of the spiral springs, 19a for example, winds up while the other spring 19b unwinds. The spiral spring which winds up transmits an increasing torque until it becomes maximum when the winding up is complete, thus ensuring positive drive. The other spring is not totally unwound since a greater unwinding than winding capacity has been provided.

This greater unwinding capacity is advantageous because the spiral springs better withstand a tensile stress produced during winding up than a compression stress produced during unwinding.

In the rest position, the turns of springs 19a, 19b are spaced apart so that each of them may be wound up while the other is unwound and conversely.

In the embodiment of FIG. 3, the two reversed springs 19a, 19b are housed in the same pinion 11a; it is clear however that these springs could be placed in different places.

I claim:

1. A rotary assistance device for coupling to a driven member which is able to rotate in both directions in response to the rotation of a drive shaft, comprising:
   a motor rotatable at a relatively high speed in relation to the speed of the drive shaft and the driven member;
   speed reducing means for reducing the speed of the motor comprising at least one pinion driven by said motor and angular torque damping means of high flexibility disposed inside said at least one pinion;
   friction coupling means for driving the driven shaft.

2. The device as claimed in claim 1 characterized by the fact that the resilient coupling of great flexibility is formed by at least one spiral spring.

3. The device as claimed in claim 1, in which the motor is adapted to rotate in a single direction, the speed reducing means comprises two gear-trains associated with two friction couplings corresponding to the two directions of rotations, one of these gear-trains comprising a reversing gear for ensuring reversal of the direction of rotation, and the angular damping means are formed by a single spiral spring disposed between the motor and a shaft or pinion common to both gear-trains.

4. The device as claimed in claim 1, in which the motor is adapted to rotate in one direction or in the other, depending on the direction of the drive torque, a single reduction gear-train connecting the motor to the driven shaft, through a single friction coupling, and the angular damping means (A) comprise two spiral springs, wound in opposite directions, and disposed in a cavity provided in a pinion of the reduction train.

5. The device as claimed in claim 4, characterized by the fact that the turns of both spiral springs, wound in opposite directions, have a greater unwinding than winding-up capacity so that, when one of the springs is completely wound up, the other is not completely unwound.

6. A rotary assistance device for coupling to a driven member which is able to rotate in both directions in response to the rotation of a drive shaft, comprising:
   a drive shaft and a driven shaft in general axial alignment;
   a motor mounted with its shaft generally parallel to said drive and driven shafts;
   friction coupling means for driving the driven shaft so as to assist the rotation imparted by the drive shaft;
   at least one pinion gear between the motor and the friction coupling means to transmit the rotary motion of the motor to the driven shaft;
   angular torque damping means inside said at least one pinion gear and interposed in the drive train so that the rotary motion from the motor is smoothly transmitted to the driven shaft.

* * * * *